United States Patent
Wybenga et al.

(10) Patent No.: US 7,822,024 B2
(45) Date of Patent: Oct. 26, 2010

(54) APPARATUS AND METHOD FOR PERFORMING SECURITY AND CLASSIFICATION IN A MULTIPROCESSOR ROUTER

(75) Inventors: Jack C. Wybenga, Plano, TX (US); Patricia Kay Sturm, McKinney, TX (US); Patrick W. Ireland, Sanger, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1167 days.

(21) Appl. No.: 10/826,668

(22) Filed: Apr. 16, 2004

(65) Prior Publication Data

US 2005/0232261 A1   Oct. 20, 2005

(51) Int. Cl.
H04L 12/28   (2006.01)
H04L 12/56   (2006.01)

(52) U.S. Cl. .................. 370/389; 370/392; 370/419; 709/238

(58) Field of Classification Search .................. None
See application file for complete search history.

(56) References Cited

U.S. PATENT DOCUMENTS 6,393,026 B1 *    5/2002   Irwin ........................ 370/401
7,032,031 B2 *    4/2006   Jungck et al. ............... 709/246
7,197,035 B2 *    3/2007   Asano ........................ 370/392
7,200,144 B2 *    4/2007   Terrell et al. ................ 370/389
7,395,301 B2 *    7/2008   Georgescu et al. .......... 708/650
7,415,540 B2 *    8/2008   Fallon et al. ................ 709/250
2003/0231625 A1 * 12/2003  Calvignac et al. ........... 370/389
2004/0078485 A1 *  4/2004  Narayanan ................... 709/242
2004/0100956 A1 *  5/2004  Watanabe .................... 370/389
2005/0138366 A1 *  6/2005  Loh et al. .................... 713/160
2005/0159181 A1 *  7/2005  Gadgil et al. ............. 455/554.2
2006/0104286 A1 *  5/2006  Cheriton ................. 370/395.32

* cited by examiner

*Primary Examiner*—Hong Cho
*Assistant Examiner*—Robert C Scheibel (57) ABSTRACT

A router for interconnecting external devices coupled to the router. The router comprises: 1) a switch fabric; and 2) a plurality of routing nodes coupled to the switch fabric, wherein each of the plurality of routing nodes comprises packet processing circuitry for transmitting data packets to, and receiving data packets from, the external devices and for transmitting data packets to, and receiving data packets from, other ones of the plurality of routing nodes via the switch fabric. The packet processing circuitry comprises: i) a first network processor comprising a first plurality of microengines, each of the first plurality of microengines capable of performing security and classification functions associated with the data packets; and ii) a second network processor comprising a second plurality of microengines, each of the second plurality of microengines capable of performing security and classification functions associated with the data packets.

19 Claims, 4 Drawing Sheets

APPARATUS AND METHOD FOR PERFORMING SECURITY AND CLASSIFICATION IN A MULTIPROCESSOR ROUTER

CROSS-REFERENCE TO RELATED APPLICATIONS

The present invention is related to that disclosed in U.S. Pat. No. 7,440,460, issued on Oct. 21, 2008, entitled "Apparatus and Method for Forwarding Mixed Data Packet Types in a High-Speed Router." U.S. Pat. No. 7,440,460 is assigned to the assignee of the present application. The subject matter disclosed in U.S. Pat. No. 7,440,460 is hereby incorporated by reference into the present disclosure as if fully set forth herein.

TECHNICAL FIELD OF THE INVENTION

The present invention is generally directed to distributed architecture routers and, in particular, to an apparatus and method using microengine threads to perform security and classification functions in a massively parallel router.

BACKGROUND OF THE INVENTION

There has been explosive growth in Internet traffic due to the increased number of Internet users, various service demands from those users, the implementation of new services, such as voice-over-IP (VoIP) or streaming applications, and the development of mobile Internet. Conventional routers, which act as relaying nodes connected to sub-networks or other routers, have accomplished their roles well, in situations in which the time required to process packets, determine their destinations, and forward the packets to the destinations is usually smaller than the transmission time on network paths. More recently, however, the packet transmission capabilities of high-bandwidth network paths and the increases in Internet traffic have combined to outpace the processing capacities of conventional routers.

This has led to the development of a new generation of massively parallel, distributed architecture routers. A distributed architecture router typically comprises a large number of routing nodes that are coupled to each other via a plurality of switch fabric modules and an optional crossbar switch. Each routing node has its own routing (or forwarding) table for forwarding data packets via other routing nodes to a destination address.

It is advantageous to provide certain security and classification features in a router. Security and classification features may include i) simple security (anonymity), ii) firewall protection, iii) configuration independence, and iv) routing based on Layer 4 and CoS criteria, and the like. However, conventional routers often use a single threaded data plane and provide little or no security and classification features in the router core. Some conventional routers provide limited security and classification features, but require special-purpose classification engine hardware that can support data rates up to 1 Gbps but cannot operate at the required 10 Gbps data rates of newer routers. In addition, some routers provide limited security and classification features without a classification engine, but at data rates much less than 1 Gbps. Thus, the lack of security and classification features in current routers limit their usefulness as access points.

Therefore, there is a need in the art for improved high-speed routers. In particular, there is a need for a high-speed router capable of implementing security and classification features at data rates of 10 Gbps.

SUMMARY OF THE INVENTION

The present invention provides security and classification functions in a high-speed router by distributing the functions among many microengine threads. In addition, routing (forwarding) on Layer 4 (socket) addresses is simplified by the use of socket-to-CoS translation tables. The present invention allows Medium Access Control (MAC) and Internet Protocol (IP) address translation and data classification based on Layer 2 through 4 addresses and Class of Service (CoS) in a high-speed router. This allows the router to perform security and classification functions not present in conventional router architectures, especially at 10 Gbps line rates. Examples of these features include: i) security, ii) firewall, iii) configuration independence, and iv) forwarding based on Layer 4 and CoS criteria.

The present invention provides security (anonymity) by translating Layer 2 and Layer 3 addresses in the forwarding engines, thereby achieving anonymity. The actual Media Access Control (MAC) and Internet Protocol (IP) addresses may be isolated to the user interface by translating the addresses to a router pool of addresses. The user addresses are not seen on the network side interfaces because addresses from the router pool of addresses are used on the network side. The present invention provides firewall protection by using the forwarding engines to restrict access to user ports to certain traffic types, sources, and destinations.

The forwarding engines of the router provide configuration independence by making the router interfaces independent of the subnet. The forwarding engines accomplish this by providing a subnet-independent Network Address Translation (NAT) function. An example of the use of this feature occurs in laptop computers. This is handy for wireless protocols, such as IEEE 802.11b. The laptop can connect to a router interface on a different subnet without changing its configuration. Although Internet providers use dynamic IP address assignment, the laptop still must be configured with the subnet address of the provider. The present invention eliminates the need for this configuration. Also, the router allows only known MAC addresses or IP addresses to gain entry, thereby enhancing security.

Finally, the present invention enables a high-speed router to perform routing based on Layer 4 and Class of Service (CoS) by allowing Layer 4 (socket) addresses to be used indirectly in the forwarding search by translation to a CoS field in the CAM lookup index or to be used directly by adding to the end of the search string. In the first case—translation of sockets to CoS—sockets are used for packet classification by the forwarding process, rather than as addresses.

Accordingly, to address the above-discussed deficiencies of the prior art, it is a primary object of the present invention to provide a router for interconnecting external devices coupled to the router. According to an advantageous embodiment of the present invention, the router comprises: 1) a switch fabric; and 2) a plurality of routing nodes coupled to the switch fabric, wherein each of the plurality of routing nodes comprises packet processing circuitry capable of transmitting data packets to, and receiving data packets from, the external devices and further capable of transmitting data packets to, and receiving data packets from, other ones of the plurality of routing nodes via the switch fabric. The packet processing circuitry comprises: i) a first network processor comprising a first plurality of microengines, each of the first plurality of microengines capable of performing security and classification functions associated with the data packets; and ii) a second network processor comprising a second plurality of microengines, each of the second plurality of microengines capable of performing security and classification functions associated with the data packets.

According to one embodiment of the present invention, the security and classification functions comprise replacing a source address associated with header information of a first data packet with an address selected from a pool of router addresses associated with the router.

According to another embodiment of the present invention, the security and classification functions comprise filtering a first data packet based on at least one of: 1) a Layer 2 address associated with the first data packet; 2) a Layer 3 address associated with the first data packet; and 3) a traffic type associated with the first data packet.

According to still another embodiment of the present invention, the security and classification functions comprise filtering a first data packet based on at least one of: 1) a Layer 4 address associated with the first data packet; and 2) a class of service (CoS) value associated with the first data packet.

According to yet another embodiment of the present invention, the security and classification functions comprise performing a Network Address Translation (NAT) function to provide subnet independence.

According to a further embodiment of the present invention, a first one of the first plurality of microengines is capable of executing N threads, wherein each of the N threads performs at least one security and classification function.

According to a still further embodiment of the present invention, a first one of the second plurality of microengines is capable of executing M threads, wherein each of the M threads performs at least one security and classification function.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged packet switch or router.

Figure 1:
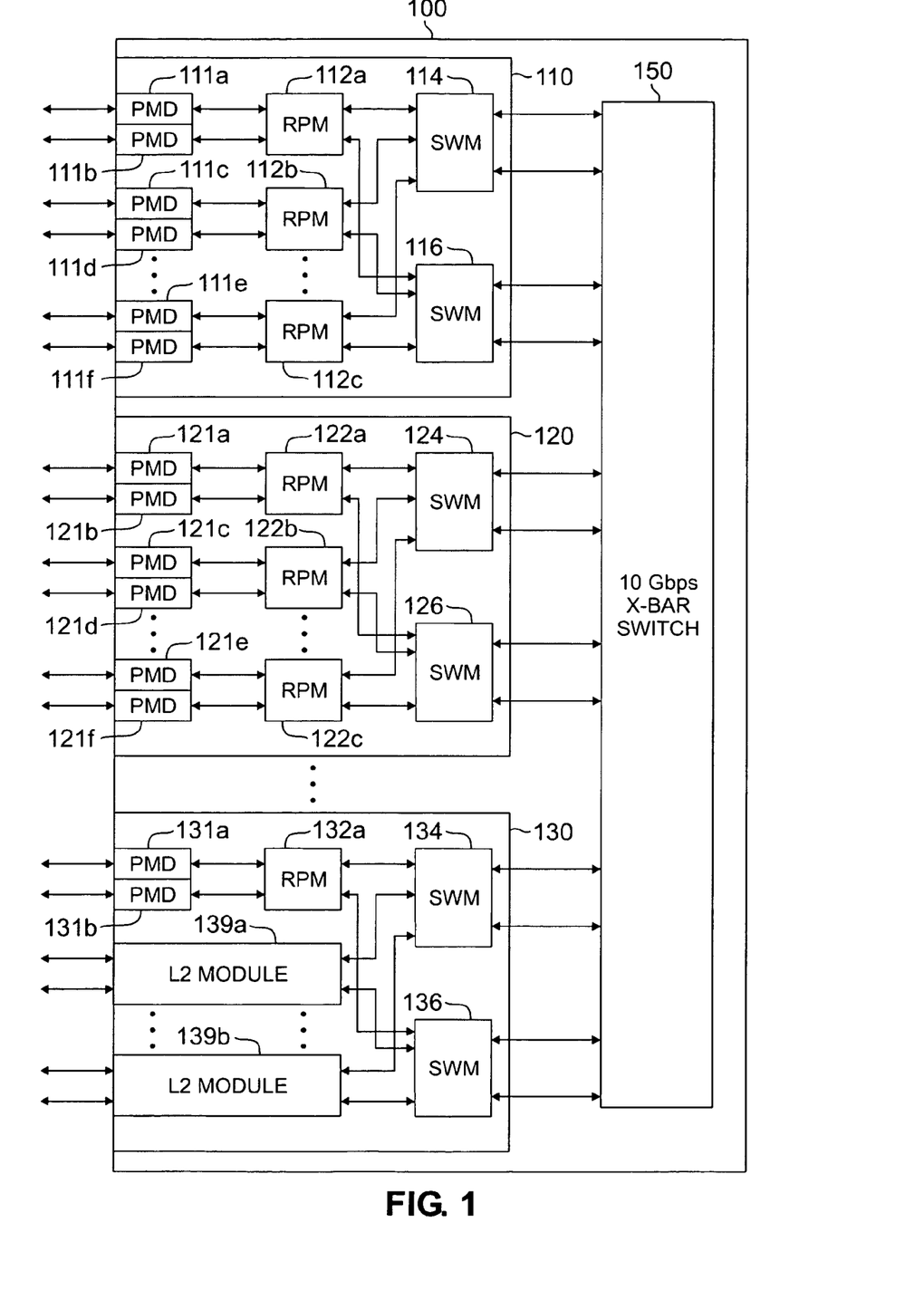
FIG. 1 illustrates an exemplary distributed architecture router, which distributes forwarding table lookup operations across a plurality of microengines and threads according to the principles of the present invention.

FIG. 1 illustrates exemplary distributed architecture router 100, which distributes control and management plane functions across a plurality of processors according to the principles of the present invention. Router 100 supports Layer 2 switching and Layer 3 switching and routing. Thus, router 100 functions as both a switch and a router. However, for simplicity, router 100 is referred to herein simply as a router. The switch operations are implied.

According to the exemplary embodiment, router 100 comprises N rack-mounted shelves, including exemplary shelves 110, 120, and 130, that are coupled via crossbar switch 150. In an advantageous embodiment, crossbar switch 150 is a 10 Gigabit Ethernet (10 GbE) crossbar operating at 10 gigabits per second (Gbps) per port.

Each of exemplary shelves 110, 120 and 130 may comprise route processing modules (RPMS) or Layer 2 (L2) modules, or a combination of route processing modules and L2 modules. Route processing modules forward data packets using primarily Layer 3 information (e.g., Internet protocol (IP) addresses). L2 modules forward data packets using primarily Layer 2 information (e.g., medium access control (MAC) addresses). In the exemplary embodiment shown in FIG. 1, only shelf 130 is shown to contain both route processing (L3) modules and L2 modules. However, this is only for the purpose of simplicity in illustrating router 100. Generally, it should be understood that many, if not all, of the N shelves in router 100 may comprise both RPMs and L2 modules.

Exemplary shelf 110 comprises a pair of redundant switch modules, namely primary switch module (SWM) 114 and secondary switch module (SWM) 116, a plurality of route processing modules 112, including exemplary route processing module (RPM) 112a, RPM 112b, and RPM 112c, and a plurality of physical media device (PMD) modules 111, including exemplary PMD modules 111a, 111b, 111c, 111d, 111e, and 111f. Each PMD module 111 transmits and receives data packets via a plurality of data lines connected to each PMD module 111.

Similarly, shelf 120 comprises a pair of redundant switch modules, namely primary SWM 124 and secondary SWM 126, a plurality of route processing modules 122, including RPM 122a, RPM 122b, and RPM 122c, and a plurality of physical media device (PMD) modules 121, including PMD modules 121a-121f. Each PMD module 121 transmits and receives data packets via a plurality of data lines connected to each PMD module 121.

Additionally, shelf 130 comprises redundant switch modules, namely primary SWM 134 and secondary SWM 136, route processing module 132a, a plurality of physical media device (PMD) modules 131, including PMD modules 131a and 131b, and a plurality of Layer 2 (L2) modules 139, including L2 module 139a and L2 module 139b. Each PMD module 131 transmits and receives data packets via a plurality of data lines connected to each PMD module 131. Each L2 module 139 transmits and receives data packets via a plurality of data lines connected to each L2 module 139.

Router 100 provides scalability and high-performance using up to M independent routing nodes (RN). A routing node comprises, for example, a route processing module (RPM) and at least one physical medium device (PMD) module. A routing node may also comprise an L2 module (L2M). Each route processing module or L2 module buffers incoming Ethernet frames, Internet protocol (IP) packets and MPLS frames from subnets or adjacent routers. Additionally, each RPM or L2M classifies requested services, looks up destination addresses from frame headers or data fields, and forwards frames to the outbound RPM or L2M. Moreover, each RPM (or L2M) also maintains an internal routing table determined from routing protocol messages, learned routes and provisioned static routes and computes the optimal data paths from the routing table. Each RPM processes an incoming frame from one of its PMD modules. According to an advantageous embodiment, each PMD module encapsulates an incoming frame (or cell) from an IP network (or ATM switch) for processing in a route processing module and performs framing and bus conversion functions.

Incoming data packets may be forwarded within router 100 in a number of different ways, depending on whether the source and destination ports are associated with the same or different PMD modules, the same or different route processing modules, and the same or different switch modules. Since each RPM or L2M is coupled to two redundant switch modules, the redundant switch modules are regarded as the same switch module. Thus, the term "different switch modules" refers to distinct switch modules located in different ones of shelves 110, 120 and 130.

In a first type of data flow, an incoming data packet may be received on a source port on PMD module 121f and be directed to a destination port on PMD module 131a. In this first case, the source and destination ports are associated with different route processing modules (i.e., RPM 122c and RPM 132a) and different switch modules (i.e., SWM 126 and SWM 134). The data packet must be forwarded from PMD module 121f all the way through crossbar switch 150 in order to reach the destination port on PMD module 131a.

In a second type of data flow, an incoming data packet may be received on a source port on PMD module 121a and be directed to a destination port on PMD module 121c. In this second case, the source and destination ports are associated with different route processing modules (i.e., RPM 122a and RPM 122b), but the same switch module (i.e., SWM 124). The data packet does not need to be forwarded to crossbar switch 150, but still must pass through SWM 124.

In a third type of data flow, an incoming data packet may be received on a source port on PMD module 111c and be directed to a destination port on PMD module 111d. In this third case, the source and destination ports are associated with different PMD modules, but the same route processing module (i.e., RPM 112b). The data packet must be forwarded to RPM 112b, but does not need to be forwarded to crossbar switch 150 or to switch modules 114 and 116.

Finally, in a fourth type of data flow, an incoming data packet may be received on a source port on PMD module 111a and be directed to a destination port on PMD module 111a. In this fourth case, the source and destination ports are associated with the same PMD module and the same route-processing module (i.e., RPM 112a). The data packet still must be forwarded to RPM 112a, but does not need to be forwarded to crossbar switch 150 or to switch modules 114 and 116.

Figure 2:
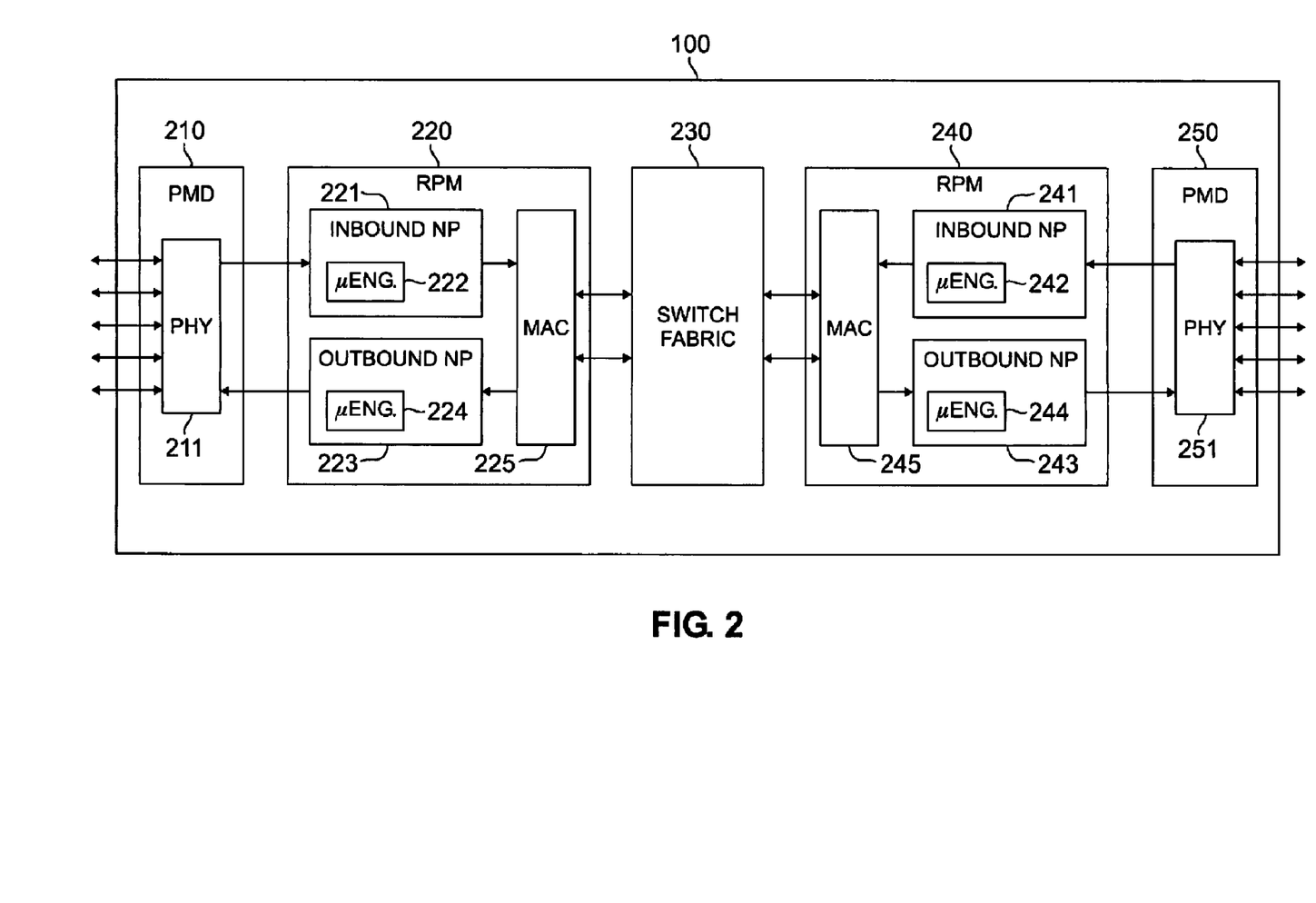
FIG. 2 illustrates selected portions of the exemplary router according to one embodiment of the present invention.

FIG. 2 illustrates selected portions of exemplary router 100 in greater detail according to one embodiment of the present invention. FIG. 2 simplifies the representation of some of the elements in FIG. 1. Router 100 comprises PMD modules 210 and 250, route processing modules 220 and 240, and switch fabric 230. PMD modules 210 and 250 are intended to represent any of PMD modules 111, 121, and 131 shown in FIG. 1. Route processing modules 220 and 240 are intended to represent any of RPM 112, RPM 122, and RPM 132 shown in FIG. 1. Switch fabric 230 is intended to represent crossbar switch 150 and the switch modules in shelves 110, 120 and 130 in FIG. 1.

PMD module 210 comprises physical (PHY) layer circuitry 211, which transmits and receives data packets via the external ports of router 100. PMD module 250 comprises physical (PHY) layer circuitry 251, which transmits and receives data packets via the external ports of router 100. RPM 220 comprises inbound network processor (NP) 221, outbound network processor (NP) 223, and medium access controller (MAC) layer circuitry 225. RPM 240 comprises inbound network processor (NP) 241, outbound network processor (NP) 243, and medium access controller (MAC) layer circuitry 245.

Each network processor comprises a plurality of microengines capable of executing threads (i.e., code) that forward data packets in router 100. Inbound NP 221 comprises N microengines (μEng.) 222 and outbound NP 223 comprises N microengines (μEng.) 224. Similarly, inbound NP 241 comprises N microengines (μEng.) 242 and outbound NP 243 comprises N microengines (μEng.) 244.

Two network processors are used in each route-processing module to achieve high-speed (i.e., 10 Gbps) bi-directional operations. Inbound network processors (e.g., NP 221, NP 241) operate on inbound data (i.e., data packets received from the network interfaces and destined for switch fabric 230). Outbound network processors (e.g., NP 223, NP 243) operate on outbound data (i.e., data packets received from switch fabric 230 and destined for network interfaces).

According to an exemplary embodiment of the present invention, each network processor comprises N=16 microengines that perform data plane operations, such as data packet forwarding. Each RPM also comprises a control plane processor (not shown) that performs control plane operations, such as building forwarding (or look-up) tables. According to the exemplary embodiment, each microengine supports eight threads. At least one microengine is dedicated to reading inbound packets and at least one microengine is dedicated to writing outbound packets. The remaining microengines are used for forwarding table lookup operations.

In order to meet the throughput requirements for line rate forwarding at data rates up to 10 Gbps, it is necessary to split the data plane processing workload among multiple processors, microengines, and threads. The first partitioning splits the workload between two network processors—one operating on inbound data packets from the network interfaces to the switch and the other operating on outbound data packets from the switch to the network interfaces. Each of these processors uses identical copies of the forwarding table.

According to an exemplary embodiment of the present invention, the control and management plane functions (or operations) of router 100 may be distributed between inbound (IB) network processor 221 and outbound network processor 223. The architecture of router 100 allows distribution of the control and management plane functionality among many processors. This provides scalability of the control plane in order to handle higher control traffic loads than traditional routers having only a single control plane processor. Also, distribution of the control and management plane operations permits the use of multiple low-cost processors instead of a single expensive processor. For simplicity in terminology, control plane functions (or operations) and management plane functions (or operations) may hereafter be collectively referred to as control plane functions.

According to the principles of the present invention, router 100 also implements security and classification functions in microengines 222, 224, 242, 244 of the inbound network processors 221, 241 and outbound network processors 223, 243. The security and classification functions are performed by each of the threads executed by each one of microengines 222, 224, 242, and 244.

Figure 3:
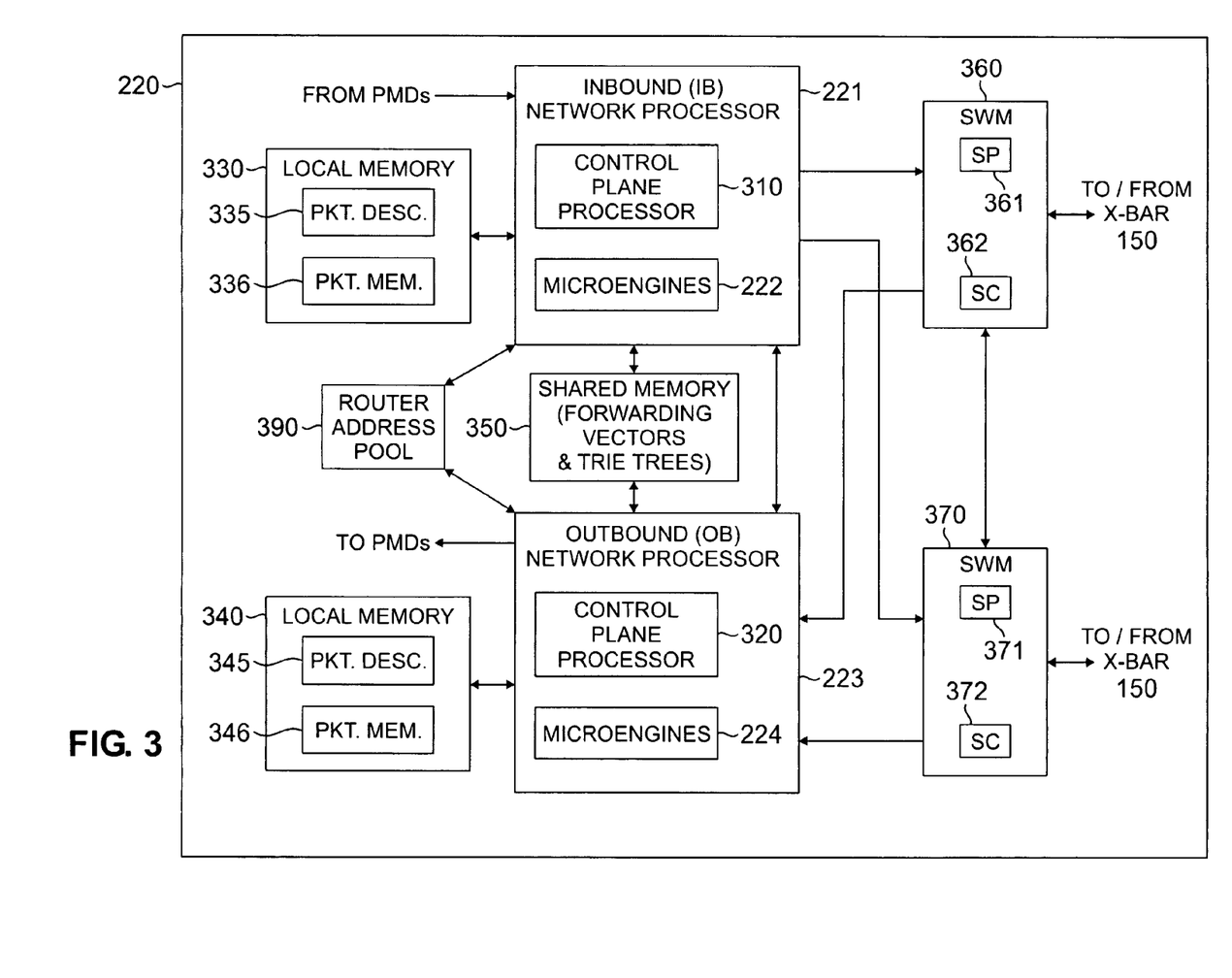
FIG. 3 illustrates the inbound network processor and outbound network processor according to an exemplary embodiment of the present invention.

FIG. 3 illustrates inbound network processor 221 and outbound network processor 223 according to an exemplary embodiment of the present invention. Inbound (IB) network processor 221 comprises control plane processor 310 and microengine(s) 222. Outbound (OB) network processor 223 comprises control plane processor 320 and microengine(s) 224. Inbound network processor 221 and outbound network processor 223 are coupled to shared memory 350, which stores forwarding table information, including forwarding vectors and trie tree search tables.

Inbound network processor 221 is coupled to local memory 330, which contains packet descriptors 335 and packet memory 336. Outbound network processor 223 is coupled to local memory 340, which contains packet descriptors 345 and packet memory 346.

Control and management messages may flow between the control and data planes via interfaces between the control plane processors and data plane processors. For example, control plane processor 310 may send control and management messages to the microengines 222 and control plane processor 320 may send control and management messages to the microengines 224. The microengines can deliver these packets to the local network interfaces or to other RPMs for local consumption or transmission on its network interfaces. Also, the microengines may detect and send control and management messages to their associated control plane processor for processing. For example, microengines 222 may send control and management plane messages to control plane processor 310 and microengines 224 may send control and management messages to control plane processor 320.

Inbound network processor 221 operates under the control of control software (not shown) stored in memory 330. Similarly, outbound network processor 223 operates under the control of control software (not shown) stored in memory 340. According to an exemplary embodiment of the present invention, the control software in memories 330 and 340 may be identical software loads.

Network processors 221 and 223 in router 100 share routing information in the form of aggregated routes stored in shared memory 350. Management and routing functions of router 100 are implemented in inbound network processor 221 and outbound network processor 223 in each RPM of router 100. Network processors 221 and 223 are interconnected through Gigabit optical links to exemplary switch module (SWM) 360 and exemplary switch module (SWM) 370. SWM 360 comprises switch processor 361 and switch controller 362. SWM 370 comprises switch processor 371 and switch controller 372. Multiple switch modules may be interconnected through 10 Gbps links via Rack Extension Modules (REXMs) (not shown).

In order to meet the bi-directional 10 Gbps forwarding throughput of the RPMS, two network processors—one inbound and one outbound—are used in each RPM. Inbound network processor 221 handles inbound (IB) packets traveling from the external network interfaces to switch fabric 230. Outbound network processor 223 handles outbound (OB) packets traveling switch fabric 230 to the external network interfaces. In an exemplary embodiment of the present invention, control plane processor (CPP) 310 comprises an XScale core processor (XCP) and microengines 222 comprise sixteen microengines. Similarly, control plane processor (CPP) 320 comprises an XScale core processor (XCP) and microengines 224 comprise sixteen microengines.

According to an exemplary embodiment of the present invention, router 100 implements a routing table search circuit as described in U.S. patent application Ser. No. 10/794,506, filed on Mar. 5, 2004, entitled "Apparatus and Method for Forwarding Mixed Data Packet Types in a High-Speed Router." U.S. patent application Ser. No. 10/794,506 was incorporated by reference above. The routing table search circuit comprises an initial content addressable memory (CAM) stage followed by multiple trie tree search table stages. The CAM stage allows searches to be performed on data packet header information other than regular address bits, such as, for example, class of service (COS) bits, packet type bits (IPv4, IPv6, MPLS), and the like.

The use of multiple threads in multiple microengines enables network processors 221 and 223 to modify a data packet during its transit through router 100. Thus, network processors 221 and 223 may provide network address translation (NAT) functions that are not present in conventional high-speed routers. This, in turn, provides dynamic address assignment to nodes in a network. Since network processors 221 and 223 are able to modify a data packet, network processors 221 and 223 also are able obscure the data packet identification. Obscuring packet identification allows router 100 to provide complete anonymity relative to the source of an inbound packet.

The ability of router 100 to distribute the data packet workload over thirty-two microengines, each capable of executing, for example, eight threads, enables router 100 to perform the additional security and classification functions at line rates up to 10 Gbps. FIG. 3 shows the flow of data through route processing module (RPM) 220. Packets enter RPM 220 through an interface—a network interface (PMD) for inbound network processor (IB NP) 221 and a switch interface for outbound network processor (OB NP) 223. IB NP 221 and OB NP 223 also may receive packets from control plane processors 310 and 320.

Microengines 222 store these data packets in packet memory 336 in local QDRAM (or RDRAM) memory 330 and write a Packet Descriptor into packet descriptors 335 in local memory 330. Similarly, microengines 224 store these data packets in packet memory 346 in local QDRAM (or RDRAM) memory 340 and write a Packet Descriptor into packet descriptors 345 in local memory 340.

A CAM search key is built for searching the initial CAM stages of the search tables in memory 350. The CAM key is built from data packet header information, such as portions of the destination address and class or service (CoS) information and a CAM lookup is done. The result of this lookup gives an index for a Vector Table Entry, which points to the start of a trie tree search table. Other information from the packet header, such as the rest of the destination address and possibly a socket address, are used to traverse the trie tree search table.

The search of the CAM stage and trie tree table results in either in a leaf or an invalid entry. Unresolved packets are either dropped or sent to control plane processors 310 and 320 for further processing. A leaf node gives a pointer to an entry in a forwarding table (i.e., a Forwarding Descriptor) in memory 350. Since shared memory space is limited, these forwarding tables may be located in local memory 330 and 340. The packet is forwarded based on the results of the search to the control plane, to another RPM network processor, or to an output port (i.e., a switch port for IB NP 221 and a network interface port for OB NP 223). The data packet is not copied as it is passed from microengine thread to microengine thread. Only the pointer to the Packet Descriptor must be passed internally. This avoids expensive copies.

Router 100 performs security and classification functions in the forwarding microengine threads. Since this functionality increases the workload, it may be necessary to allocate more threads, possibly in different microengines, to meet the throughput. According to an exemplary embodiment of the present invention, Network Address Translation (NAT) is implemented in the packet-processing step using source address translation information that is added to the Forwarding Descriptors (or Forwarding Table Entries). This feature allows subnet independent connections.

For example, a laptop computer may be configured for its home subnet. When transported to a remote office location, the laptop computer may connect to a different subnet through router 100 without changing its own configuration. The forwarding process may be used to translate the actual IP address of a data packet to one of many network addresses from router address pool 390. This is particularly useful for laptops using wireless networks, such as IEEE 802.11b. Although many Internet providers dynamically assign IP addresses, it still is necessary for the computer to be configured with the subnet address of the Internet provider. The subnet-independent Network Address Translation (NAT) function in router 100 does not require this subnet configuration change.

Since router 100 may use subnet independent NAT to translate IP addresses, this also allows user anonymity. The Layer 2 and Layer 3 addresses in the user network may be hidden from the destination network. The IP address of the user is confined to the private network of the user. A network address from router address pool 390 is used on the public network.

Router 100 also may classify the data packet during the forwarding process based on Layer 2 through 4 headers, including class of service (CoS). This allows filtering and blocking of data packets based on header contents. This is useful for a firewall implementation in which it is desirable to control what types of data are permitted to flow through the system and what source and destination addresses are permitted. Traditionally, firewalls in routers control traffic at the packet level by packet filtering, where packets are allowed to pass through the router or are blocked from passing through the router based on source address, destination address, and port number. Typically, host devices are used to control traffic based upon more detailed information, such as traffic type and Layer 4 information. Advantageously, the microengines of router 100 allow traffic type and Layer 4 addressing to be used as firewall filtering criteria.

Furthermore, the microengines of router 100 allow direct use of socket addresses for some Layer 4 header types, such as UDP or TCP at the end of the search address. Router 100 allows use of sockets directly at the end of the search for terminating packets, where the entire Layer 3 destination address field is used for the lookup. If the destination address is consumed and a leaf node is not reached, Layer 4 addresses for certain packet types may be used for lookup. In this case, there is no need to find the subnet mask, because the packet type implies the subnet mask. The socket search may be appended to the destination address search.

Advantageously, router 100 supports a translation table that translates a 12-bit socket address into an 8-bit CoS field that is used in the initial CAM key portion of the search. This is similar to the approach of doing the subnet search first, but has two primary differences. First, this approach uses the socket address for classification, rather than for addressing. Thus, the order of searching Layer 3 and Layer 4 addresses is not relevant. Second, this approach allows the socket search to be skipped for subnets for which sockets are unimportant, since the control plane processor can write these fields to zeros for subnets in which the socket address is unimportant.

Class of service (CoS) bits may be obtained from the IPv4 or IPv6 packet headers, may be obtained from the MPLS Label Field, or may be built from socket addresses. As noted, a configurable lookup table is used to translate a 12-bit socket address into an 8-bit CoS. Although an 8-bit CoS field may be used, the value returned is often a 6-bit DiffServ value. If socket-to-CoS translation is not desired, the translated entry is set to zero. Control plane processor 310 of inbound network processor 221 maintains this translation table and uses it to build the forwarding tables. RPM 220 also supports use of the socket address directly as the last 12 bits of the search string, as described above.

Figure 4:
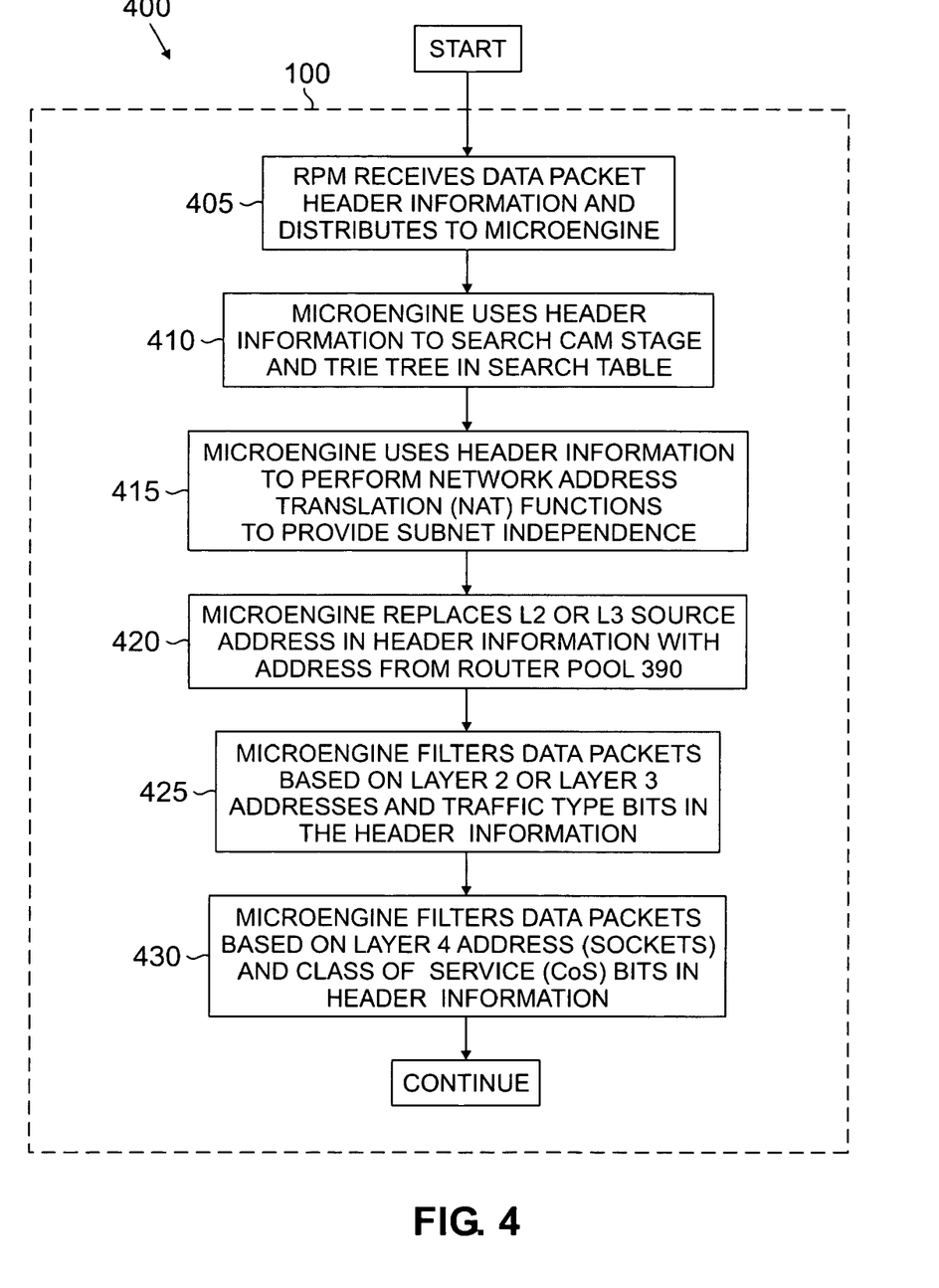
FIG. 4 is a flow diagram illustrating the security and classification operations of the exemplary router according to the principles of the present invention.

FIG. 4 depicts flow diagram 400, which illustrates the security and classification operations of exemplary router 100 according to the principles of the present invention. Initially, the RPM receives the data packet header information and distributes the header information to a selected micro-engine 222 (process step 405). Microengine 222 uses the header information to search the CAM stage and the trie tree structure in the search table (process step 410). Step 410 may include a socket-to-CoS translation in generating the CAM search key. Optionally, microengine 222 also uses the header information to perform Network Address Translation (NAT) functions to provide subnet independence (process step 415). Microengine 222 also may optionally replace an L2 or L3 source address in the header information with a selected address from router pool 390 (process step 420). Microengine 222 optionally may filter data packets based on Layer 2 or Layer 3 addresses and traffic type bits in the header information (process step 425). Finally, microengine 222 may filter the data packets based on Layer 4 addresses (sockets) and class of service (CoS) bits in the header information (process step 430).

Although the present invention has been described with an exemplary embodiment, various changes and modifications may be suggested to one skilled in the art. It is intended that the present invention encompass such changes and modifications as fall within the scope of the appended claims.

What is claimed is:

1. A router for interconnecting external devices coupled to said router, said router comprising:
   a switch fabric; and
   a plurality of routing nodes coupled to said switch fabric, wherein each of said plurality of routing nodes comprises:
      a first network processor comprising a first plurality of microengines, each of said first plurality of microengines for performing first security and classification functions associated with data packets received from said external devices and transmitted to said switch fabric, wherein each data packet is distributed to a selected microengine;

a second network processor comprising a second plurality of microengines, each of said second plurality of microengines for performing second security and classification functions associated with data packets received from said switch fabric and transmitted to said external devices, wherein each data packet is distributed to a selected microengine; and a routing table search circuit comprising an initial content addressable memory stage followed by a plurality of trie tree search table stages, wherein one of said first and second security and classification functions is performed according to information from the routing table search circuit, wherein the routing table search circuit is configured to:

build a content addressable memory search key prior to the initial content addressable memory stage, wherein the content addressable memory search key is built from a portion of a destination address and a class of service (CoS) value; and form an index from a result of the initial content addressable memory stage prior to the plurality of trie tree search table stages, wherein the index points to a start of a trie tree search table.

2. The router as set forth in claim 1 wherein said first and second security and classification functions comprise replacing a source address associated with header information of a first data packet with an address selected from a pool of router addresses associated with said router.

3. The router as set forth in claim 1 wherein said first and second security and classification functions comprise filtering a first data packet based on at least one of: 1) a Layer 2 address associated with said first data packet; 2) a Layer 3 address associated with said first data packet; and 3) a traffic type associated with said first data packet.

4. The router as set forth in claim 1 wherein said first and second security and classification functions comprise filtering a first data packet based on at least one of: 1) a Layer 4 address associated with said first data packet; and 2) a class of service (CoS) value associated with said first data packet.

5. The router as set forth in claim 1 wherein said first and second security and classification functions comprise performing a Network Address Translation (NAT) function to provide subnet independence.

6. The router as set forth in claim 1 wherein a first one of said first plurality of microengines is capable of executing N threads, wherein each of said N threads performs at least one security and classification function.

7. The router as set forth in claim 6 wherein a first one of said second plurality of microengines is capable of executing M threads, wherein each of said M threads performs at least one security and classification function.

8. A communication network comprising a plurality of routers that communicate data packets to one another and to interfacing external devices, each of said plurality of routers comprising:

a switch fabric; and a plurality of routing nodes coupled to said switch fabric, wherein each of said plurality of routing nodes comprises:

a first network processor comprising a first plurality of microengines, each of said first plurality of microengines for performing first security and classification functions associated with data packets received from said external devices and transmitted to said switch fabric, wherein each data packet is distributed to a selected microengine;

a second network processor comprising a second plurality of microengines, each of said second plurality of microengines for performing second security and classification functions associated with data packets received from said switch fabric and transmitted to said external devices, wherein each data packet is distributed to a selected microengine; and a routing table search circuit comprising an initial content addressable memory stage followed by a plurality of trie tree search table stages, wherein one of said first and second security and classification functions is performed according to information from the routing table search circuit, wherein the routing table search circuit is configured to:

build a content addressable memory search key prior to the initial content addressable memory stage, wherein the content addressable memory search key is built from a portion of a destination address and a class of service (CoS) value; and form an index from a result of the initial content addressable memory stage prior to the plurality of trie tree search table stages, wherein the index points to a start of a trie tree search table.

9. The communication network as set forth in claim 8 wherein said first and second security and classification functions comprise replacing a source address associated with header information of a first data packet with an address selected from a pool of router addresses associated with said router.

10. The communication network as set forth in claim 8 wherein said first and second security and classification functions comprise filtering a first data packet based on at least one of: 1) a Layer 2 address associated with said first data packet; 2) a Layer 3 address associated with said first data packet; and 3) a traffic type associated with said first data packet.

11. The communication network as set forth in claim 8 wherein said first and second security and classification functions comprise filtering a first data packet based on at least one of: 1) a Layer 4 address associated with said first data packet; and 2) a class of service (CoS) value associated with said first data packet.

12. The communication network as set forth in claim 8 wherein said first and second security and classification functions comprise performing a Network Address Translation (NAT) function to provide subnet independence.

13. The communication network as set forth in claim 8 wherein a first one of said first plurality of microengines is capable of executing N threads, wherein each of said N threads performs at least one security and classification function.

14. The communication network as set forth in claim 13 wherein a first one of said second plurality of microengines is capable of executing M threads, wherein each of said M threads performs at least one security and classification function.

15. For use in a router comprising a switch fabric and a plurality of routing nodes coupled to the switch fabric, each of the routing nodes for transmitting data packets to, and receiving data packets from, external devices and transmitting data packets to, and receiving data packets from, other routing nodes via the switch fabric, a method comprising the steps of:

performing routing table searching using an initial content addressable memory stage followed by a plurality of trie tree search table stages;

performing first security and classification functions in a first network processor comprising a first plurality of microengines, each of said first plurality of microengines capable of executing said first security and classification functions, wherein the first network processor processes data packets being transmitted from the external devices to the switch fabric, and wherein each data packet is distributed to a selected microengine; and performing second security and classification functions in a second network processor comprising a second plurality of microengines, each of the second plurality of microengines capable of executing the second security and classification functions, wherein the second network processor processes data packets being transmitted from the switch fabric to the external devices, and wherein each data packet is distributed to a selected microengine, wherein one of said first and second security and classification functions is performed according to a result of the step of performing the routing table searching, and wherein performing routing table searching comprises:

building a content addressable memory search key prior to the initial content addressable memory stage, wherein the content addressable memory search key is built from a portion of a destination address and a class of service (CoS) value; and forming an index from a result of the initial content addressable memory stage prior to the plurality of trie tree search table stages, wherein the index points to a start of a trie tree search table.

16. The method as set forth in claim 15 wherein the first and second security and classification functions comprise replacing a source address associated with header information of a first data packet with an address selected from a pool of router addresses associated with the router.

17. The method as set forth in claim 15 wherein the first and second security and classification functions comprise filtering a first data packet based on at least one of: 1) a Layer 2 address associated with the first data packet; 2) a Layer 3 address associated with the first data packet; and 3) a traffic type associated with the first data packet.

18. The method as set forth in claim 15 wherein the first and second security and classification functions comprise filtering a first data packet based on at least one of: 1) a Layer 4 address associated with the first data packet; and 2) a class of service (CoS) value associated with the first data packet.

19. The method as set forth in claim 15 wherein the first and second security and classification functions comprise performing a Network Address Translation (NAT) function to provide subnet independence.

* * * * *